(12) United States Patent
Koo et al.

(10) Patent No.: US 9,393,769 B2
(45) Date of Patent: Jul. 19, 2016

(54) FLEXIBLE DISPLAY PANEL PEELING APPARATUS AND PEELING METHOD USING THE SAME

(71) Applicant: Samsung Display Co., Ltd., Yongin (KR)

(72) Inventors: Hyunwoo Koo, Hwaseong-si (KR); Jusuck Lee, Seoul (KR); Taewoong Kim, Yongin-si (KR); Danbi Choi, Suwon-si (KR); Sunho Kim, Seongnam-si (KR); Kyungmin Choi, Seoul (KR); Hayk Khachatryan, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/316,314

(22) Filed: Jun. 26, 2014

(65) Prior Publication Data
US 2015/0122427 A1    May 7, 2015

(30) Foreign Application Priority Data

Nov. 1, 2013    (KR) ........................ 10-2013-0132315

(51) Int. Cl.
*B32B 38/10*    (2006.01)
*B32B 43/00*    (2006.01)

(52) U.S. Cl.
CPC ............... *B32B 43/006* (2013.01); *B32B 38/10* (2013.01); *B32B 2457/20* (2013.01); *Y10T 156/1132* (2015.01); *Y10T 156/1168* (2015.01); *Y10T 156/1944* (2015.01); *Y10T 156/1978* (2015.01)

(58) Field of Classification Search
CPC .. B32B 38/10; B32B 43/00; Y10T 156/1168; Y10T 156/1132; Y10T 156/1978; Y10T 156/1944
USPC .......... 156/715, 764, 714, 707, 758, 924, 937
See application file for complete search history.

(56) References Cited

U.S. PATENT DOCUMENTS

| 5,891,297 A | 4/1999 | Stadtmueller |
| 6,638,378 B2 | 10/2003 | O'Bryan et al. |

(Continued)

FOREIGN PATENT DOCUMENTS

| JP | 2007-245564 | 9/2007 |
| JP | 2008-110488 | 5/2008 |

(Continued)

OTHER PUBLICATIONS

Cheng-Chung Lee et al., "A Novel Approach to Make Flexible Active Matrix Displays", SID 10 Digest, pp. 810-813, Taiwan, 2010.

*Primary Examiner* — Mark A Osele
*Assistant Examiner* — Nickolas Harm
(74) *Attorney, Agent, or Firm* — H.C. Park & Associates, PLC

(57) ABSTRACT

A flexible display panel peeling apparatus for peeling a flexible display panel attached to a top surface of a substrate includes a stage fixed to the substrate and a peeling plate comprising a bottom surface that is convex toward the flexible display panel and a plurality of adsorption units defined in the bottom surface to adsorb the flexible display panel to the bottom surface. Since the flexible display panel is successively peeled through the peeling plate, the flexible display panel may be peeled from the substrate without being damaged.

20 Claims, 13 Drawing Sheets

(56) References Cited

U.S. PATENT DOCUMENTS

| | | |
|---|---|---|
| 6,640,866 B2 | 11/2003 | Kerr et al. |
| 8,052,935 B2 * | 11/2011 | Leininger et al. ............ 422/144 |
| 8,128,773 B2 | 3/2012 | Chun et al. |
| 8,142,610 B2 * | 3/2012 | Tani et al. .................... 156/715 |
| 8,376,017 B2 | 2/2013 | Lee et al. |
| 8,464,773 B2 * | 6/2013 | Hagman ....................... 156/715 |
| 2004/0050489 A1 * | 3/2004 | Ohwada et al. .............. 156/344 |
| 2008/0236743 A1 * | 10/2008 | Kye et al. ..................... 156/344 |
| 2008/0289763 A1 * | 11/2008 | Su ................................. 156/344 |
| 2009/0008032 A1 * | 1/2009 | Wesseling .................... 156/344 |

FOREIGN PATENT DOCUMENTS

| | | |
|---|---|---|
| JP | 2008-186007 | 8/2008 |
| KR | 10-0669792 | 1/2007 |
| KR | 10-0901498 | 6/2009 |
| KR | 10-1023732 | 3/2011 |
| KR | 1020120096336 | 8/2012 |

* cited by examiner

FLEXIBLE DISPLAY PANEL PEELING APPARATUS AND PEELING METHOD USING THE SAME

CROSS REFERENCE TO RELATED APPLICATION

This U.S. non-provisional patent application claims priority from and the benefit of Korean Patent Application No. 10-2013-0132315, filed on Nov. 1, 2013, which is hereby incorporated by reference for all purposes as if fully set forth herein.

BACKGROUND

1. Field

Exemplary embodiments of the present disclosure relate to a flexible display panel peeling apparatus having improved reliability in a flexible display panel peeling process and a flexible display panel peeling method using the same.

2. Discussion

Electronic equipment, such as smart phones, digital cameras, notebook computers, navigation units, smart televisions, and the like, include a display panel for displaying images.

In recent years, flexible display panels are being developed for use in the electronic equipment. Since components of the flexible display panel are formed of a flexible material, the flexible display panel may have a flexible property.

A flexible display panel may include pixels for generating images. To form the pixels, the flexible display panel may be attached to a substrate that is formed of a rigid material, and then, patterning and deposition processes may be performed on the substrate. When the pixel formation is finished, a peeling process for peeling the flexible display panel from the substrate may be performed. However, there is a need for an improved peeling process that may reduce or eliminate damage to the flexible display panel during the peeling process.

The above information disclosed in this Background section is provided to enhance understanding of the background of the disclosed subject matter and therefore may contain information that does not form any part of the prior art nor what the prior art may suggest to a person of ordinary skill in the art.

SUMMARY

Exemplary embodiments of the present disclosure provide a flexible display panel peeling apparatus having improved reliability in a flexible display panel peeling process and a flexible display panel peeling method using the same.

Additional features of the present disclosure will be set forth in the description which follows, and in part will be apparent from the description, or may be learned by practice of the disclosed subject matter.

Exemplary embodiments of the present disclosure provide a flexible display panel peeling method. The method includes disposing a flexible display panel on a substrate and disposing a peeling plate on the flexible display panel. The peeling plate includes adsorption units and a convex bottom surface configured to contact the flexible display panel. The method further includes adsorbing, via the adsorption units, the flexible display panel, and rolling the peeling plate on the flexible display panel.

Exemplary embodiments of the present disclosure provide a flexible display panel peeling apparatus including a substrate configured to support a flexible display panel and a peeling plate. The peeling plate includes adsorption units and a convex bottom surface configured to contact the flexible display panel. The peeling plate is configured to be rolled on the flexible display panel.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings are included to provide a further understanding of the disclosed subject matter and are incorporated in and constitute a part of this specification. The drawings illustrate exemplary embodiments of the disclosed subject matter and, together with the description, serve to explain principles of the disclosed subject matter.

DETAILED DESCRIPTION OF ILLUSTRATED EMBODIMENTS

Figure 1:
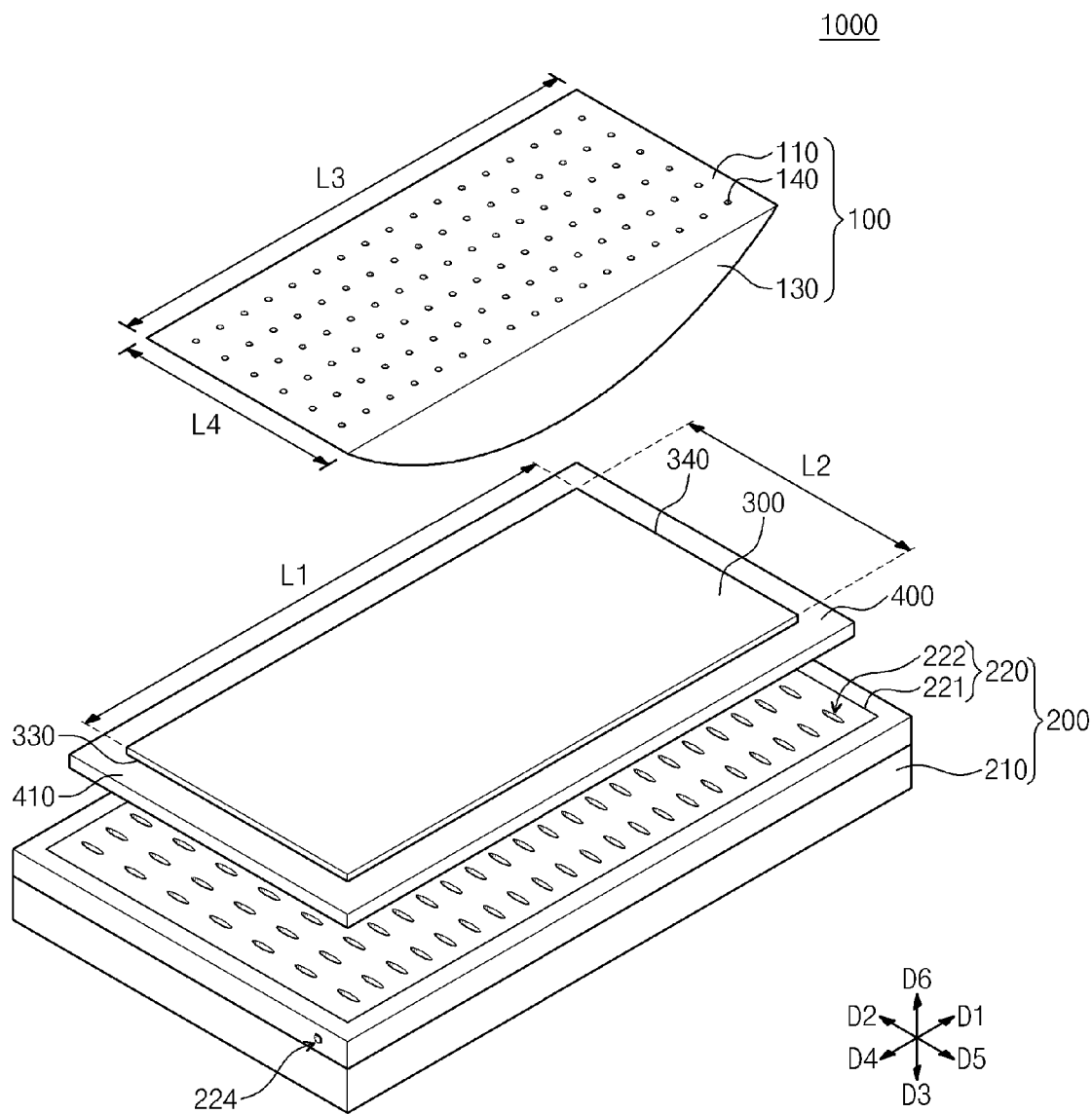
FIG. 1 is a perspective view of a flexible display panel peeling apparatus according to exemplary embodiments of the prevent disclosure.

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present disclosure.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Hereinafter, exemplary embodiments of the disclosed subject matter will be described in detail with reference to the accompanying drawings.

Figure 2:
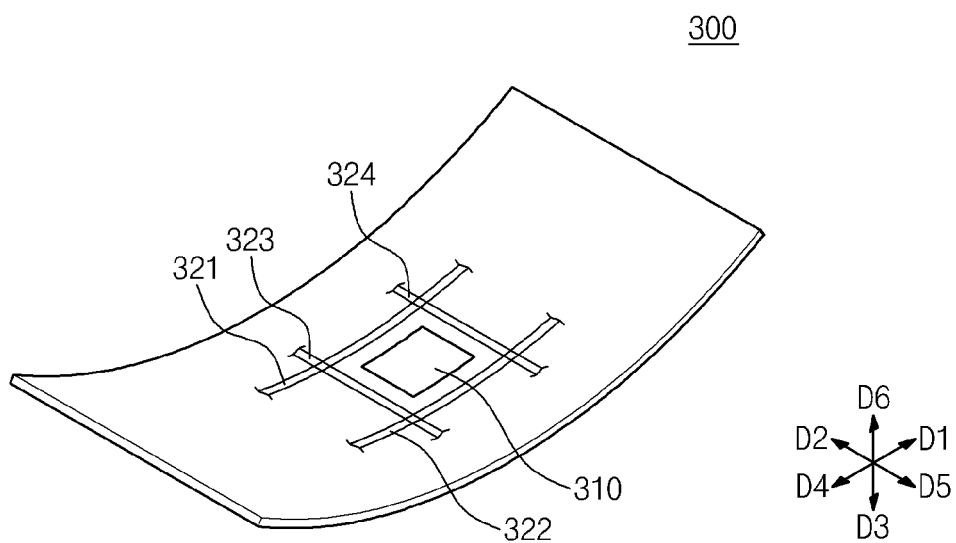
FIG. 2 is a perspective view of the flexible display panel of FIG. 1.
Figure 3:
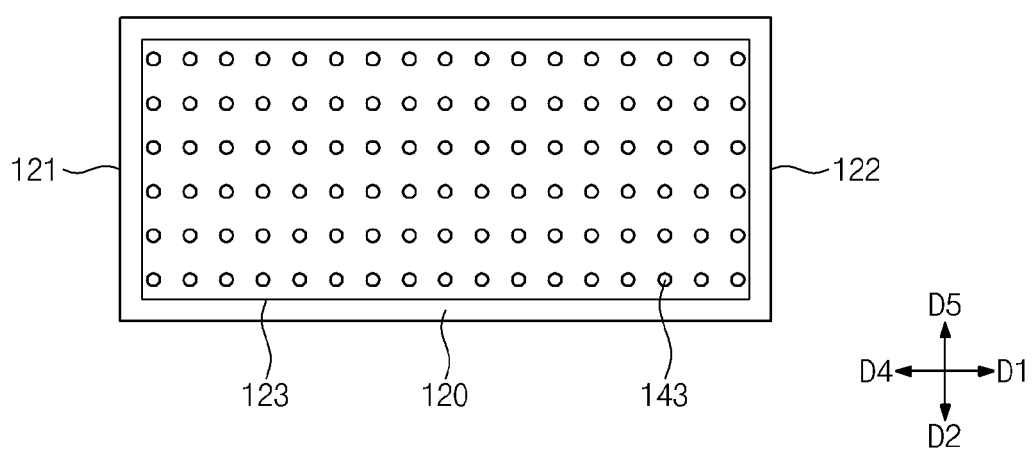
FIG. 3 is a bottom surface of a peeling plate illustrated in FIG. 1.
Figure 4:
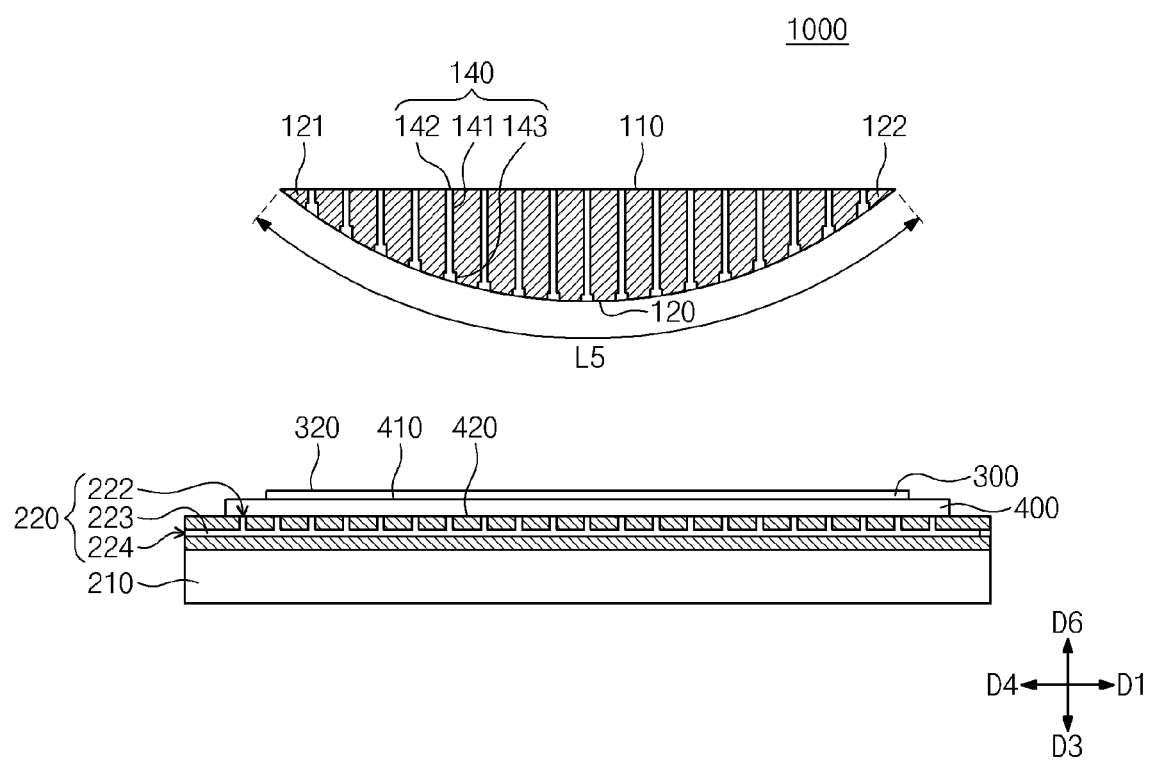
FIG. 4 is a cross-sectional view of the flexible display panel peeling apparatus illustrated in FIG. 1.

FIG. 1 is a perspective view of a flexible display panel peeling apparatus according to exemplary embodiments of the prevent disclosure. FIG. 2 is a perspective view of the flexible display panel of FIG. 1. FIG. 3 is a bottom surface of the peeling plate illustrated in FIG. 1, and FIG. 4 is a cross-sectional view of the flexible display panel peeling apparatus illustrated in FIG. 1.

Referring to FIGS. 1, 2, 3, and 4, a flexible display panel peeling apparatus 1000 may include a peeling plate 100 and a stage 200. A flexible display panel 300 may be peeled from a substrate 400 attached to the stage 200.

The flexible display panel 300 extends by a first length L1 in a first direction D1 and by a second length L2 in a second direction D2 perpendicular to the first direction D1. In some cases, the first length L1 may be greater than the second length L2. The flexible display panel 300 may have a substantially rectangular shape. However, it should be understood that the flexible display panel 300 may have various shapes.

The flexible display panel 300 may be flexible. Each of the components of the flexible display panel 300 may be formed of a flexible material, such as plastic, thus providing the flexible display panel 300 with a flexible property. As shown in FIG. 2, the flexible display panel 300 may be bent in a third direction D3 perpendicular to the first and second directions D1 and D2 by application of an external force.

Hereinafter, a direction opposite to the first direction D1 may be referred to as a fourth direction D4, a direction opposite to the second direction D2 may be referred to as a fifth direction D5, and a direction opposite to the third direction D3 may be referred to as a sixth direction D6.

The flexible display panel 300 is configured to display images. The flexible display panel 300 may include various display panels, such as an organic light emitting display panel, a liquid crystal display panel, a plasma display panel, an electrophoretic display panel, and an electrowetting display panel.

The flexible display panel 300 includes a pixel 310 for generating images and a plurality of signal lines 321, 322, 323, and 324. The plurality of signal lines 321, 322, 323, and 324 include first gate line 321 and second gate line 322 for receiving gate signals and first data line 323 and second data line 324 for receiving data voltages. The first gate line 321 and second gate line 322 extend in the first direction D1 and are arranged in parallel with each other in the second direction D2. The first data line 323 and second data line 324 extend in the second direction D2 and are arranged in parallel with each other in the first direction D1.

The pixel 310 may be connected to a corresponding gate line of the first gate line 321 and the second gate line 322 and a corresponding data line of the first data line 323 and the second data line 324 to generate an image.

The substrate 400 may be formed of various suitable materials, including, for example, a rigid material such as glass. The substrate 400 includes a substrate top surface 410 facing the sixth direction and a substrate bottom surface 420 opposite to the substrate top surface 410. The substrate 400 may have a shape (e.g., rectangular) corresponding to the shape of the flexible display panel 300. When viewed in plan view, the substrate 400 may have a size greater than a size of the flexible display panel 300.

The flexible display panel 300 may be attached to the substrate top surface 410. The pixel 310 and the plurality of signal lines 321, 322, 323, and 324 may be formed on the flexible display panel 300 through various suitable processes, such as pixel and line formation processes. Since the flexible display panel 300 is flexible, the pixel 310 and the plurality of signal lines 321, 322, 323, and 324 may be bent or stretched while performing the pixel and line formation processes to cause a misalignment therebetween. Accordingly, the pixel 310 and the signal lines 321, 322, 323, and 324 may be misaligned with respect to each other. To prevent the misalignment from occurring, the pixel and line formation processes may be performed while the flexible display panel 300 is attached to the substrate 400. For example, the flexible display panel 300 and the substrate 400 may be attached to each other by using an adhesive layer (not shown) that is disposed between the flexible display panel 300 and the substrate 400.

The stage 200 fixes the substrate 400 and includes a base plate 210 and an adsorption pad 220. The adsorption pad 220 is disposed on a top surface of the base plate 210 to fix the substrate 400 to the base plate 210.

Each of the base plate 210 and the adsorption pad 220 may have a shape (e.g., rectangular) corresponding to the shapes of the flexible display panel 300 and the substrate 400.

The adsorption pad 220 includes a seating area 221. The substrate 400 is seated on the seating area 221. The substrate bottom surface 420 contacts the seating area 221.

In some cases, the adsorption pad 220 includes a plurality of vacuum holes 222 in the seating area 221. The adsorption pad 220 may adsorb the substrate 400 using a vacuum provided by the vacuum holes 222. The plurality of vacuum holes 222 may have various suitable shapes, such as an approximate matrix shape. The plurality of vacuum holes 222 are defined by partially opening a top surface of the adsorption pad 220 in the third direction D3. When viewed in plan view, each of the vacuum holes 222 may have a bar shape that extends in the second direction D2. However, it should be understood that the vacuum holes 222 may be modified in various shapes.

The adsorption pad 220 includes a vacuum cavity 223. The vacuum cavity 223 may be a hollow within the adsorption pad 220. The vacuum cavity 223 may have an approximate rectangular parallelepiped shape that extends to correspond to the seating area 221. The vacuum cavity 223 may be formed under the plurality of vacuum holes 222. The plurality of vacuum holes 222 may extend in the third direction D3 and may be connected to the vacuum cavity 223. The adsorption pad 220 includes a vacuum exhaust tube 224 formed by opening one side surface of the adsorption pad 220. The vacuum exhaust tube 224 extends in the first direction D1 to connect the vacuum cavity 223 to a first vacuum unit (not shown). The first vacuum unit is configured to vacuum-exhaust the vacuum cavity 223 and the plurality of vacuum holes 222.

The plurality of vacuum holes 222 may be vacuum-exhausted to be in a negative pressure state. Thus, the substrate 400 may be vacuum-adsorbed to the adsorption pad 220 by a suction force generated in the plurality of vacuum holes 222.

The peeling plate 100 may be disposed on the stage 200, and the flexible display panel 300 and the substrate 400 may be disposed between the peeling plate 100 and the stage 200.

The peeling plate 100 includes a top surface 110, a bottom surface 120, a side surface 130, and a plurality of adsorption units 140. The peeling plate 100 adsorbs the flexible display panel 300 to the bottom surface 120 to successively peel the flexible display panel 300 from the substrate 400.

The top surface 110 faces the sixth direction D6, and the bottom surface 120 faces the third direction D3. The side surface 130 may face the fifth direction D5 and may be formed between the top surface 110 and the bottom surface 120 to connect the top surface 110 to the bottom surface 120 in the first direction D1.

The top surface 110 may have a substantially flat shape. When viewed in a plan view, the top surface 110 may have a substantially rectangular shape corresponding to a shape of the flexible display panel 300. The top surface 110 may have a third length L3 extending in the first direction D1 and a fourth length L4 extending in the second direction D2. In some cases, the fourth length L4 may be greater than the second length L2 of the flexible display panel 300.

A section of the peeling plate 100 in the second direction D2 may have, for example, a "D" shape that rotates at an angle of about 90 degrees in a clockwise direction. Thus, the bottom surface 120 may have a curved surface that is convex toward the flexible display panel 300. The bottom surface 120 may include a first end 121 and a second end 122. The first end 121 may be disposed on a side of the bottom surface 120 in the fourth direction D4 to extend in the second direction D2 so that the first end 121 is connected to the top surface 110 along the second direction D2. The second end 122 may be disposed on a side of the bottom surface 120 in the first direction D1 to extend in the second direction D2 so that the second end 122 is connected to the top surface 110 along the second direction D2.

Each of the first end 121 and the second end 122 extends by the fourth length L4 in the second direction D2. An outer circumferential surface of the bottom surface 120 may have a length L5 greater than the first length L1 of the flexible display panel 300.

The adsorption units 140 adsorb the flexible display panel 300. The bottom surface 120 includes an adsorption area 123. In some cases, the plurality of adsorption units 140 may be formed in the adsorption area 123 in an approximate matrix shape. When viewed in a plan view, the adsorption area 123 may have an approximate rectangular shape corresponding to the shape of the flexible display panel 300. The flexible display panel 300 may include a panel top surface 320 facing the sixth direction D6, and the plurality of adsorption units 140 may adsorb the panel top surface 320 of the flexible display panel 300.

The plurality of adsorption units 140 include an adsorption pipe 141, an upper hole 142, and a lower hole 143 to adsorb the flexible display panel 300. The adsorption pipe 141 is formed by opening the top surface 110 up to the bottom surface 120 along the third direction D3. The upper hole 142 is formed at the top surface 110 of the peeling plate 100 at one end of an adsorption pipe 141, and the lower hole 143 is formed at the bottom surface 120 of the peeling plate 100 at another end of the adsorption pipe 141.

When viewed in a plan view, the adsorption pipe 141, the upper hole 142, and the lower hole 143 may have a circular shape. However, it should be understood that the adsorption pipe 141, the upper hole 142, and the lower hole 143 may have various shapes and are not limited to circular shapes.

The upper hole 142 may be connected to a second vacuum unit (not shown). The second vacuum unit may vacuum-exhaust the inside of the adsorption pipe 141 to provide a negative pressure state inside the adsorption pipe 141.

The lower hole 143 may contact the panel top surface 320 of the flexible display panel 300 when the panel top surface 320 contacts the bottom surface 120. In this case, the panel top surface 320 of the flexible display panel 300 may be vacuum-adsorbed to the bottom surface 120 by the suction force generated in the lower hole 143.

The flexible display panel peeling apparatus 1000 may further include a moving unit (not shown) for moving the peeling plate 100. The moving unit may move the peeling plate 100 to peel the flexible display panel 300.

Figure 5A:
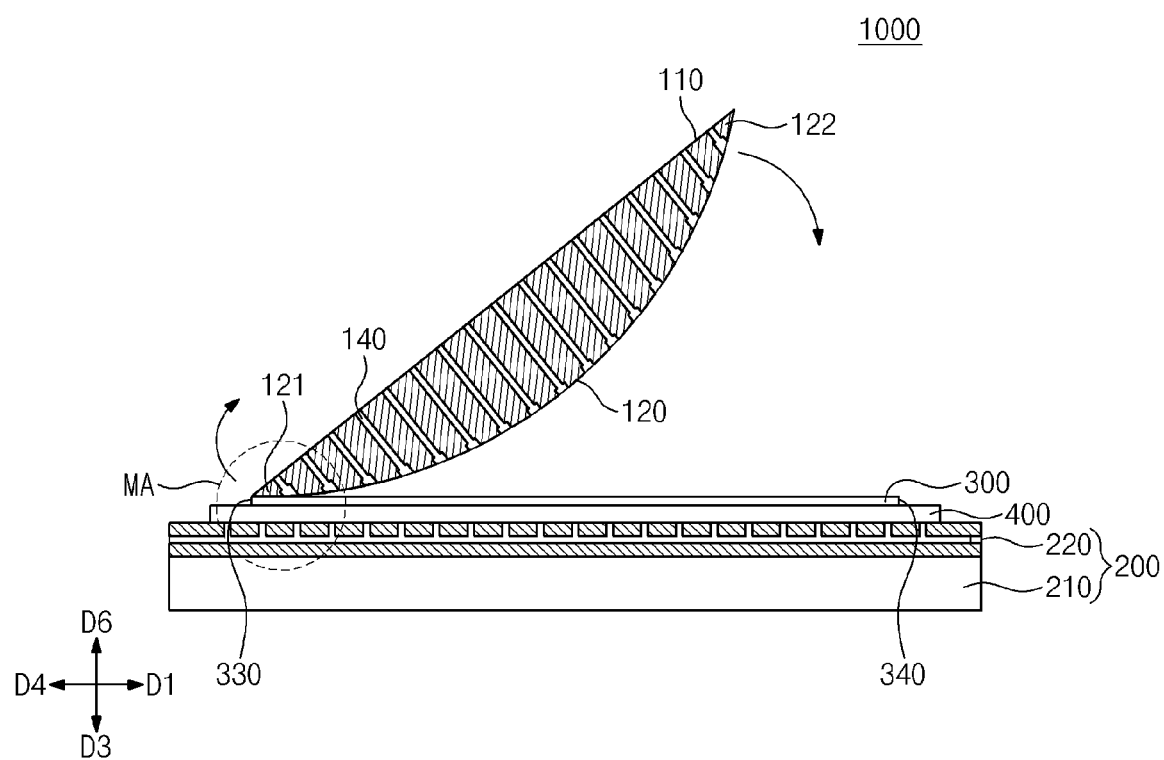
FIGS. 5A and 5B illustrate examples of a peeling process according to exemplary embodiments of the present disclosure.
Figure 5B:
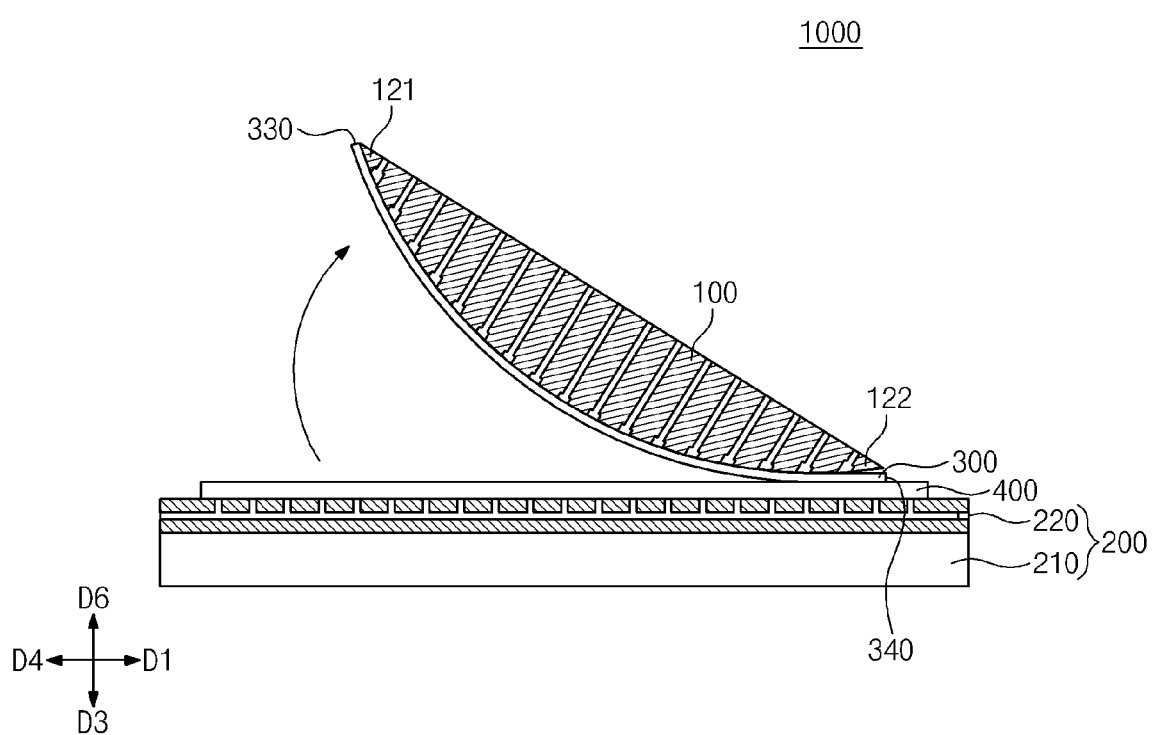
Figure 6:
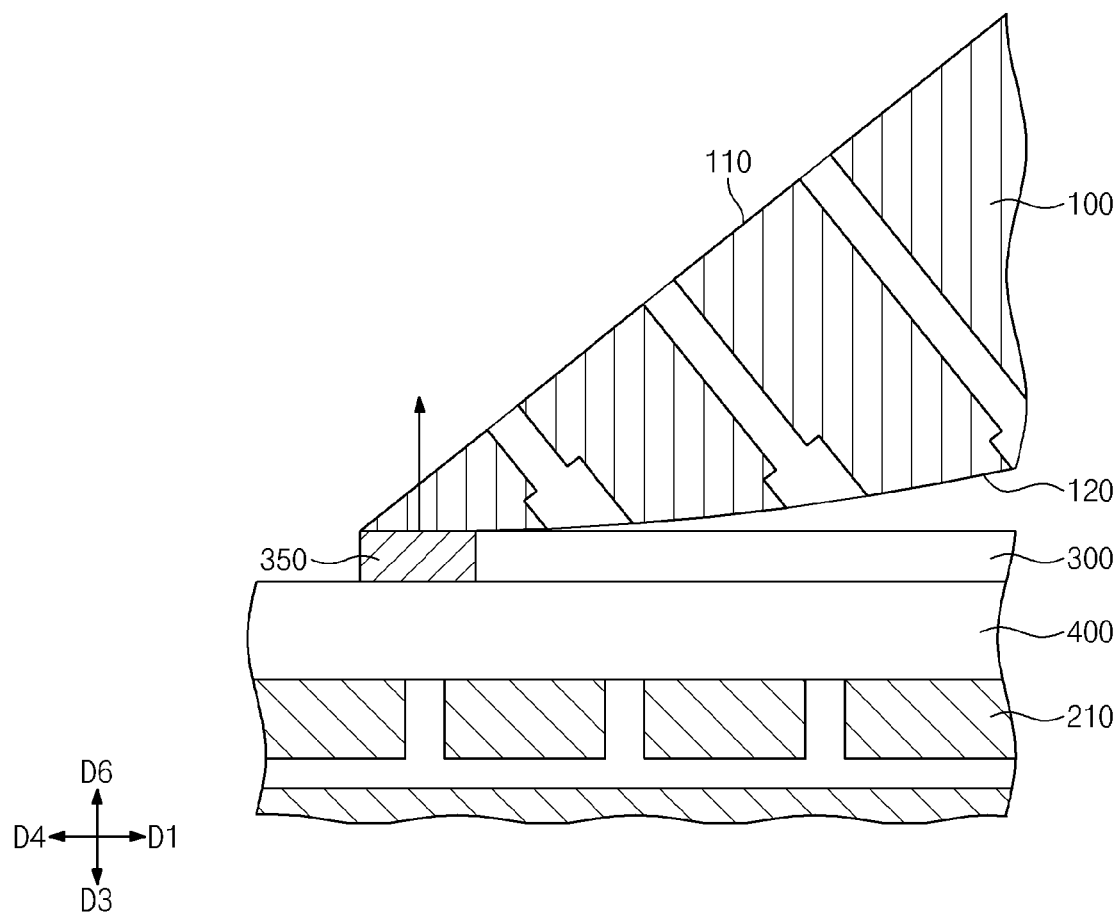
FIG. 6 is an enlarged cross-sectional view of a region MA of FIG. 5A according to exemplary embodiments of the present disclosure.

FIGS. 5A and 5B illustrate examples of a peeling process according to exemplary embodiments of the present disclosure. FIG. 6 is an enlarged cross-sectional view of a region MA of FIG. 5A.

Referring to FIG. 5A, the flexible display panel 300 may be adsorbed to the bottom surface 120 of the peeling plate 100 to successively peel the flexible display panel 300 from the substrate 400.

The flexible display panel 300 includes a first panel end and a second panel end 340. The first panel end 330 is disposed on a side of the flexible display panel 300 in the fourth direction D4 to extend in the second direction D2 (as shown in FIG. 1), and the second panel end 340 is disposed on a side opposite to the first panel end 330 in the first direction D1 to extend in the second direction D2.

The peeling plate 100 may be disposed on the flexible display panel 300 in the third direction D3 in an inclined-rolling manner, as shown in FIGS. 5A and 5B. Thus, the first end 121 may contact the first panel end 330. An adsorption unit of the plurality of adsorption units 140 adjacent to the first end 121 may vacuum-adsorb the panel top surface 320 of the first panel end 330.

Thereafter, the peeling plate 100 may roll along the flexible display panel 300 in the first direction D1 so that the bottom surface 120 successively contacts the panel top surface 320 along the first direction D1. The plurality of adsorption units 140 may then successively adsorb the panel top surface 320 in contact with the bottom surface 120.

The flexible display panel 300 adsorbed to the peeling plate 100, as shown in FIG. 5A, may subsequently be peeled from the substrate 400 by the peeling plate 100. Referring to FIG. 5B, the flexible display panel 300 may be successively peeled from the substrate 400 along the curved surface of the bottom surface 120 of the peeling plate 100. The peeling may successively proceed from the first panel end 330 to the second panel end 340 in the first direction D1. Since the flexible display panel 300 has flexibility, the flexible display panel 300 may be adsorbed and peeled in a curved manner to corresponding to the curved surface of the bottom surface 120.

The peeling plate 100 may roll along the panel top surface 320 until the second end 122 contacts the second panel end 340. As described above, the outer circumferential surface of the bottom surface 120 has the length L5 greater than the first length L1 of the flexible display panel 300. Thus, when the peeling plate 100 fully rolls up to the second end 122, the bottom surface 120 successively contacts the entire panel top surface 320. Thus, the flexible display panel 300 is fully peeled from the substrate 400 along the first direction D1.

As described above, when the flexible display panel 300 is successively peeled through the peeling plate 100, the flexible display panel 300 may be peeled from the substrate 400 without damaging the flexible display panel 300. Thus, the flexible display panel peeling apparatus 1000 may prevent the flexible display panel 300 from being damaged during the peeling process to improve reliability in the peeling process.

Referring to FIG. 6, a peeling region 350 of the flexible display panel 300 that is peeled from the substrate 400 is determined at a specific time point at which the peeling plate 100 rolls along the first direction D1. The peeling region 350 ascends in the sixth direction D6 as the peeling plate 100 rolls.

As described above, since the flexible display panel 300 is attached to the substrate 400 by the adhesive layer, if the peeling region 350 ascends, a tension may be applied to a bottom surface of the peeling region 350 toward the substrate 400 by the adhesive layer. The tension may be generated to correspond to a size of the peeling region 350. For example, if the peeling region 350 is wide, the tension applied to the peeling region 350 is correspondingly large in intensity. If the peeling region 350 is narrow, the tension applied to the peeling region 350 is correspondingly small in intensity.

Since the flexible display panel 300 is successively peeled in a curved manner in the first direction D1 along the curved surface of the bottom surface 120, the peeling region 350 may be narrow in the first direction D1. Thus, the tension applied to the peeling region 350 may be small in intensity. As a result, the flexible display panel 300 may be easily peeled from the substrate 400, and also, the flexible display panel 300 may not be damaged thereby improving reliability in the peeling process.

If a curvature radius of the bottom surface 120 is increased, the flexible display panel 300 may be more easily peeled. If the peeling plate 100 has a roller shape, a size of the peeling plate 100 will increase as the curvature radius of the roller shape increases. However, according to exemplary embodiments of the present disclosure, the bottom surface 120 may have a curved surface having a curvature radius, whereas the top surface 110 may be flat. Thus, the peeling plate 100 may be reduced in size.

Figure 7A:
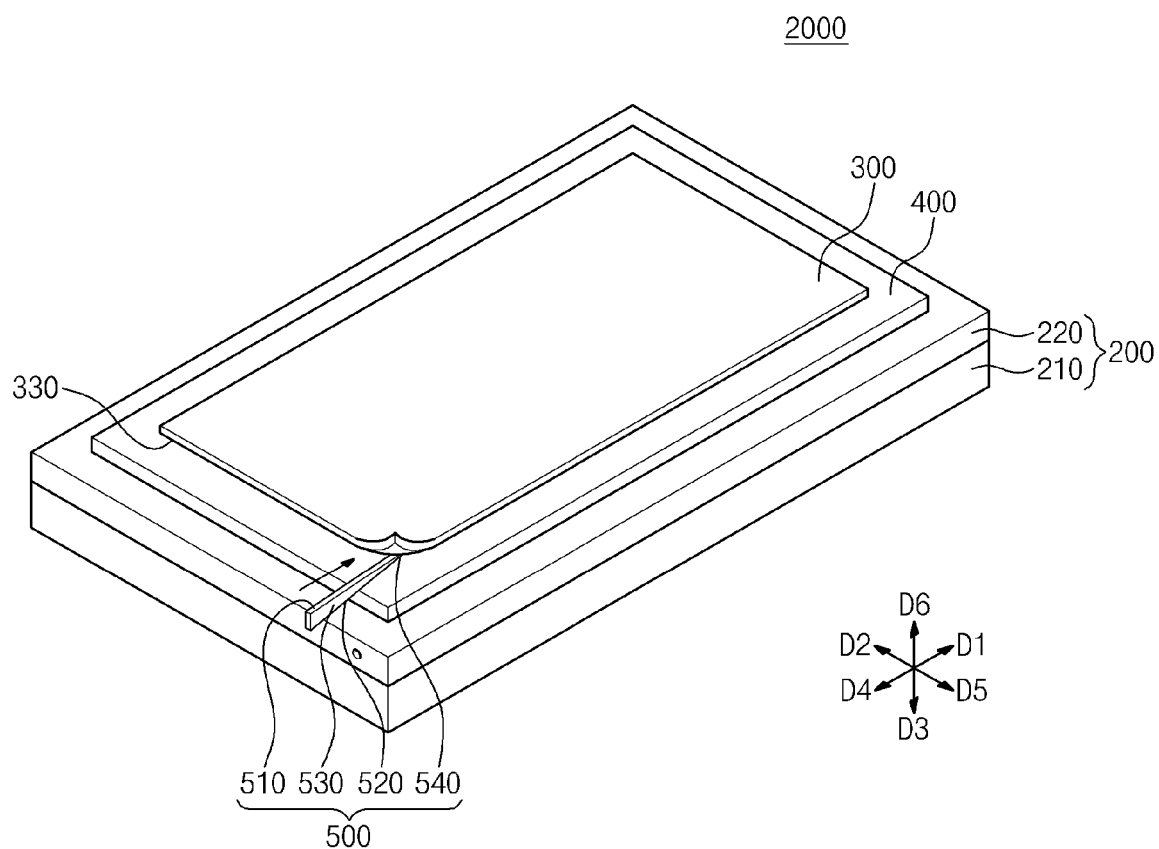
FIGS. 7A, 7B, and 7C illustrate a flexible display panel peeling apparatus with a peeling knife according to exemplary embodiments of the present disclosure.
Figure 7B:
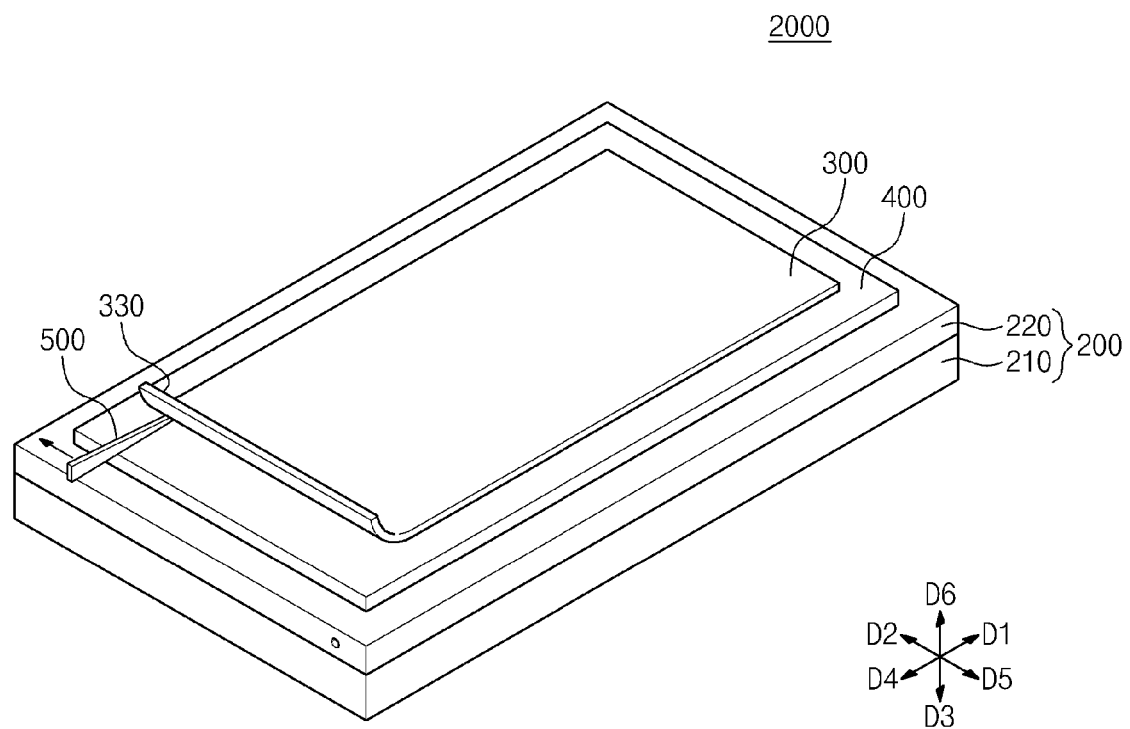
Figure 7C:
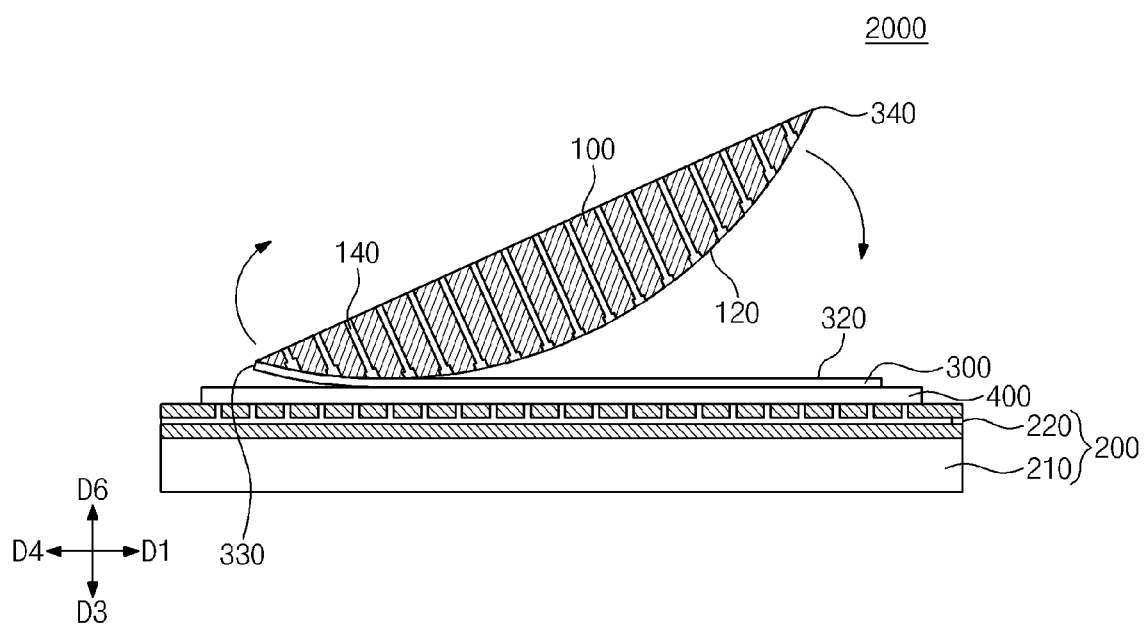
Figure 8A:
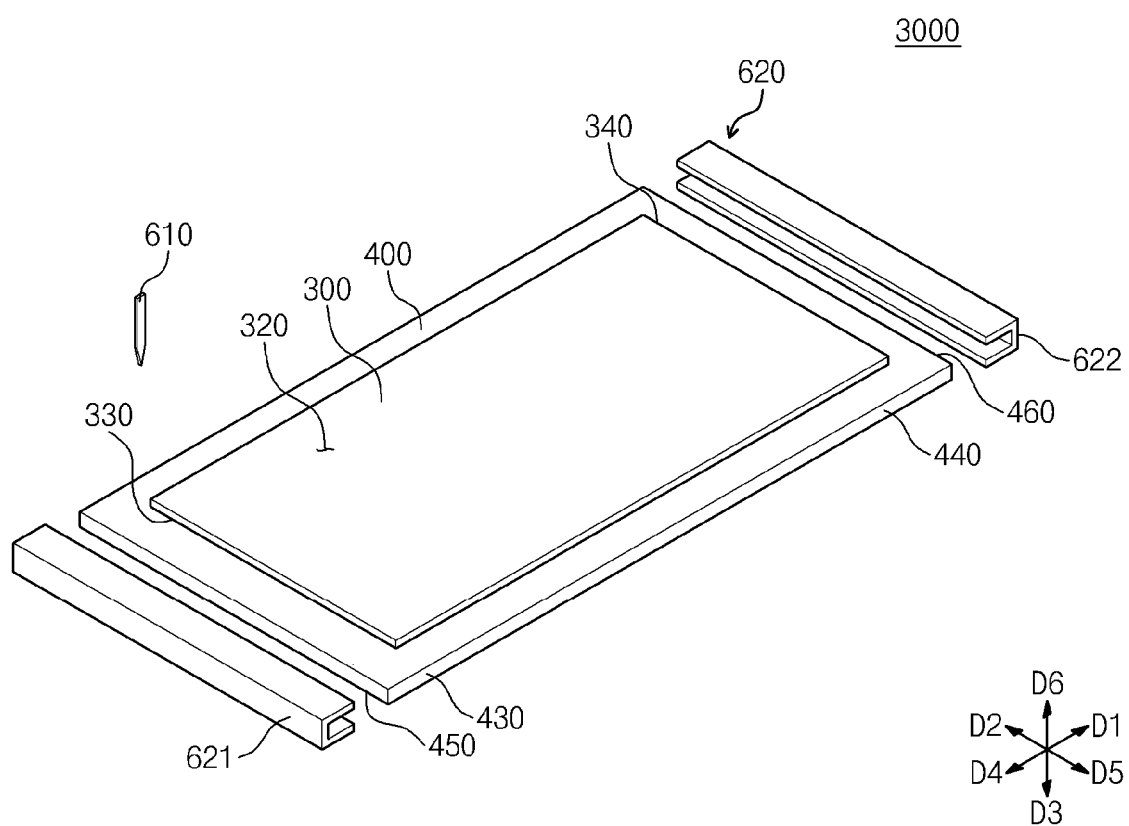
FIGS. 8A, 8B, 8C, and 8D illustrate a flexible display panel peeling apparatus with a scribing unit and a substrate inverting unit according to exemplary embodiments of the present disclosure.
Figure 8B:
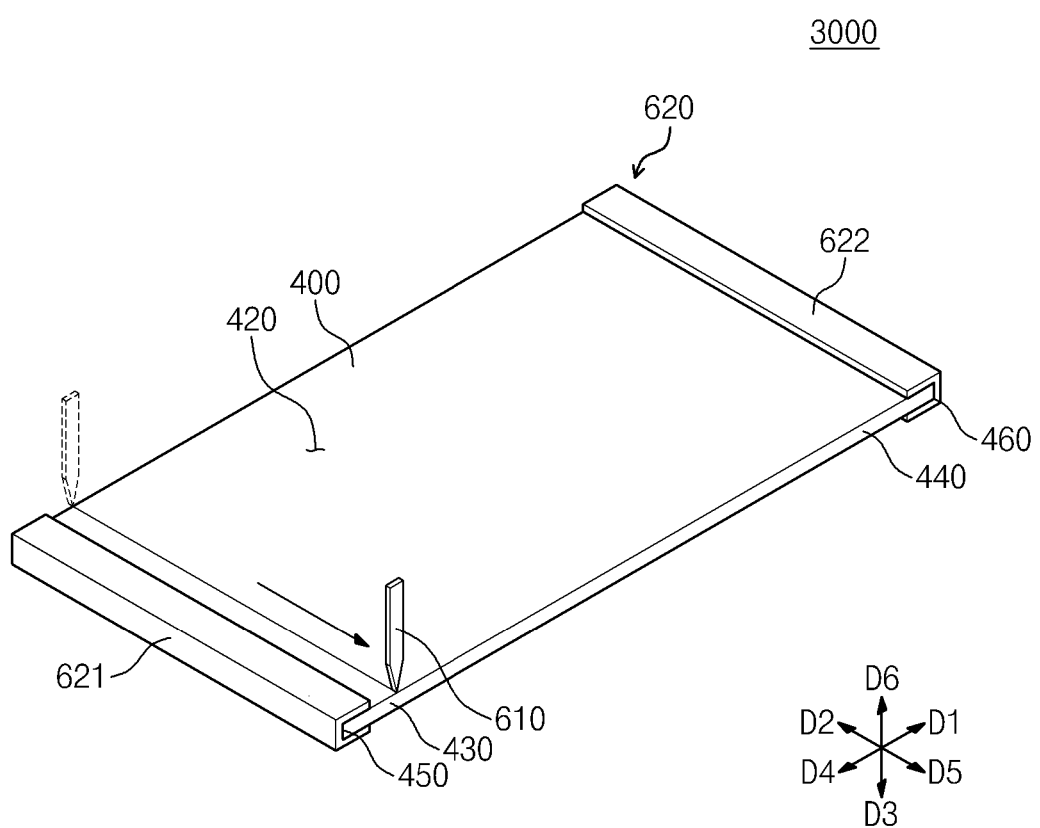
Figure 8C:
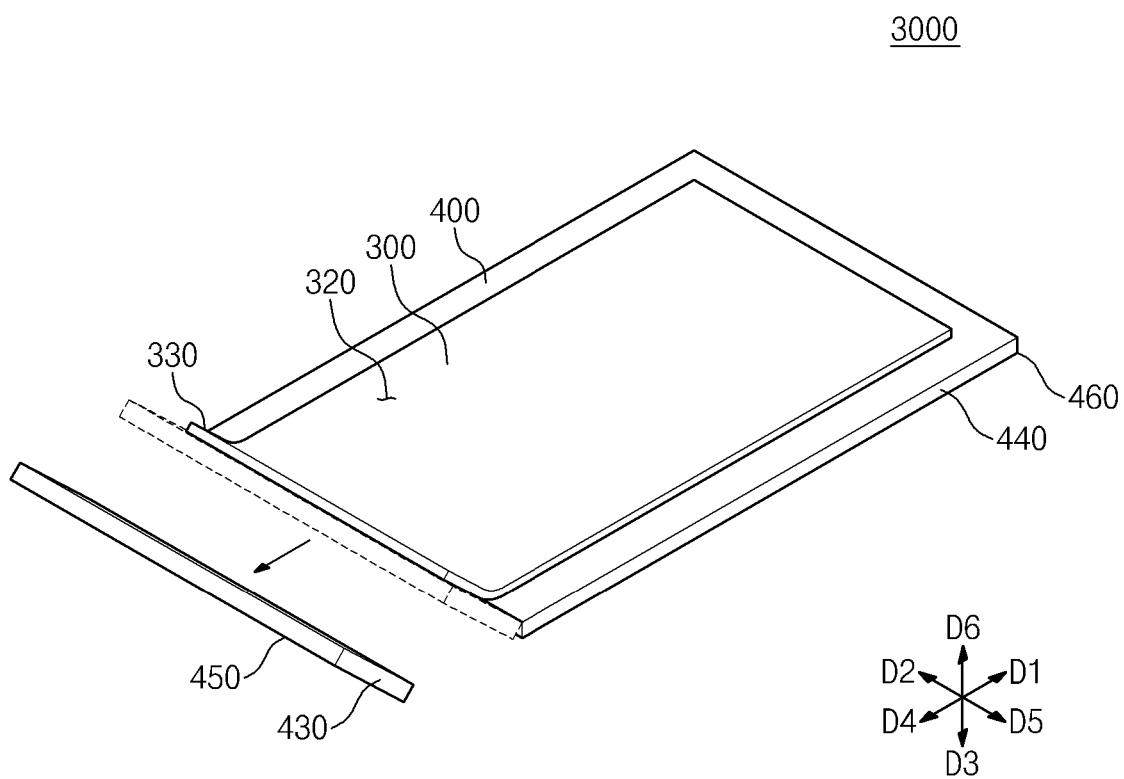
Figure 8D:
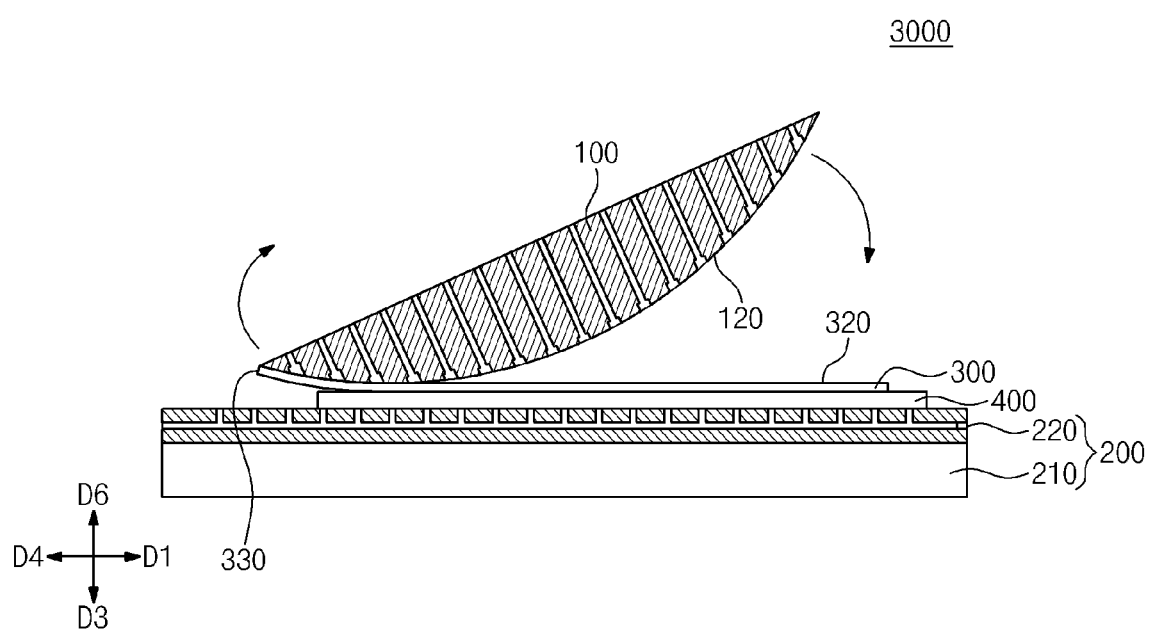

FIGS. 7A, 7B, and 7C illustrate a flexible display panel peeling apparatus 2000 with a peeling knife 500 according to exemplary embodiments of the present disclosure. The flexible display panel peeling apparatus 2000 includes the peeling plate 100 and the stage 200 described with reference to FIGS. 1, 2, 3, 4, 5, and 6.

Referring to FIGS. 7A, 7B, and 7C, the flexible display panel peeling apparatus 2000 includes a peeling knife 500. The peeling knife 500 may peel one end of the flexible display panel 300 from the substrate 400 in any suitable direction, for example, the second direction D2, to initially peel the flexible display panel 300.

The peeling knife 500 may be disposed adjacent to the first panel end 330. The peeling knife 500 includes a first surface 510 facing, in an inclined manner, the first panel end 330, a second surface 520 opposite to the first surface 510 and facing, in an inclined manner, a top surface of the substrate 400, a side surface 530 connecting the first and second surfaces 510 and 520 to each other, and an insertion edge 540. Each of the first surface 510 and the second surface 520 extends in an inclined manner in the first direction D1 to form the insertion edge 540 so that the peeling knife 500 is easily inserted between the first panel end 330 and the substrate 400.

The insertion edge 540 may be inserted into a side of the first panel end 330 in the fifth direction D5. Thereafter, when the insertion edge 540 is inserted between the first panel end 330 and the substrate 400, the peeling knife 500 may move along the second direction D2. Thus, the insertion edge 540 may peel the first panel end 330 from the substrate 400 in the second direction D2.

Thereafter, the peeling plate 100 may vacuum-adsorb a side of the first panel end 330 that is initially peeled.

The peeling plate 100 may roll along the flexible display panel 300 in the first direction D1 so that the bottom surface 120 successively contacts the panel top surface 320 along the first direction D1. Thus, the bottom surface 120 successively contacts the panel top surface 320 of the flexible display panel 300, and the plurality of adsorption units 140 successively adsorb the panel top surface 320 that is in contact with the bottom surface 120.

The flexible display panel 300 adsorbed to the peeling plate 100 is successively peeled from the substrate 400 in the first direction D1 by the peeling plate 100.

In summary, to easily peel the flexible display panel 300 from the substrate 400, an initial peeling process may be performed using the peeling knife 500 and subsequently the peeling process may be performed using a peeling plate 100. The flexible display panel 300 may be initially peeled without applying a large force to the flexible display panel 300, and also, the initial peeling may be more accurately performed. Thus, the peeling process may be performed without damaging the flexible display panel 300 to improve reliability in the peeling process.

FIGS. 8A, 8B, 8C, and 8D illustrate a flexible display panel peeling apparatus 3000 with a scribing unit 610 and a substrate inverting unit 620 according to exemplary embodiments of the present disclosure. The flexible display panel peeling apparatus 3000 according to exemplary embodiments of the disclosure includes the peeling plate 100 and the stage 200 described with reference to FIGS. 1, 2, 3, 4, 5, and 6, although the peeling plate 100 and the stage 200 have not been shown in 8A, 8B, 8C, and 8D.

Referring to FIGS. 8A, 8B, 8C, and 8D, the flexible display panel peeling apparatus 3000 may include a scribing unit 610 and a substrate inverting unit 620.

The substrate inverting unit 620 is configured to invert the flexible display panel 300 and the substrate 400, and to support the flexible display panel 300 and the substrate 400 after inverting the flexible display panel 300 and the substrate 400.

The substrate 400 may be divided into a first region 430 adjacent to the first panel end 330 and a second region 440 that is a region other than the first region 430. The first region 430 and the second region 440 bisect the substrate 400 in the second direction D2.

The substrate 400 may include a first substrate end 450 and a second substrate end 460. The first substrate end 450 extends from a side of the first region 430 in the fourth direction D4 and extends further than the first panel end 330. A surface of the first substrate end 450 may be exposed. The second substrate end 460 extends from a side of the second region 440 in the first direction D1 and extends further than the second panel end 340. A surface of the second substrate end 460 may be exposed.

The substrate inverting unit 620 includes a first support 621 and a second support 622. The first support 621 may be disposed on a side of the first substrate end 450 and may extend in the second direction D2. The first support 621 may be coupled to the first substrate end 450. The second support 622 may be disposed on a side of the second substrate end 460 and may extend in the second direction D2. The second support 622 may be coupled to the second substrate end 460. In an initial state, the panel top surface 320 may face the sixth direction D6. The first support 621 and the second support 622 may then invert the flexible display panel 300 and the substrate 400 so that the substrate bottom surface 420 faces the sixth direction D6. The scribing unit 610 is configured to scribe the substrate bottom surface 420 while moving in the fifth direction D5 along a boundary between the first region 430 and the second region 440.

Thereafter, the first support 621 and the second support 622 re-invert the flexible display panel 300 and the substrate 400 so that the panel top surface 320 faces the sixth direction D6 again. Since the first region 430 and the second region 440 are separated from the flexible display panel 300 along the boundary between the first region 430 and the second region 440 which are scribed, the first panel end 330 may be initially peeled from the substrate 400.

Thereafter, the substrate 400 and the flexible display panel 300 from which the first region 430 is removed are fixed to the stage 200. Then, the peeling plate 100 vacuum-adsorbs a side of the first panel end 330 that is initially peeled.

Thereafter, the peeling plate 100 may roll along the flexible display panel 300 in the first direction D1 so that the bottom surface 120 successively contacts the panel top surface 320 along the first direction D1. Thus, the bottom surface 120 successively contacts the panel top surface 320 of the flexible display panel 300, and the plurality of adsorption units 140 successively adsorb the panel top surface 320 that is in contact with the bottom surface 120.

The flexible display panel 300 adsorbed to the peeling plate 100 is successively peeled from the substrate 400 in the first direction D1 by the peeling plate 100.

In summary, to easily peel the flexible display panel 300 from the substrate 400, an initial peeling process may be performed using a scribing unit 610 and a substrate inverting unit 620 and subsequently the peeling process may be performed using a peeling plate 100. The flexible display panel 300 may be initially peeled without applying large force to the flexible display panel 300, and also, the initial peeling may be more accurately performed. Thus, the peeling process may be performed without damaging the flexible display panel 300 to improve reliability in the peeling process.

According to exemplary embodiments of the disclosure, a flexible display panel peeling apparatus may successively peel a flexible display panel along a curved bottom surface of a peeling plate. Thus, the flexible display panel may be peeled from the substrate without damaging the flexible display panel. Thus, the flexible display panel peeling process using the flexible display panel peeling apparatus may be improved in reliability.

It should be understood that the peeling process has been described with respect to certain directions in the present disclosure. However, exemplary embodiments of the present disclosure are not limited thereto. For example, the peeling process may be performed in other directions other than direction D1. Similar variations may be made without departing from the scope of the disclosed subject matter.

It will be apparent to those skilled in the art that various modifications and variations can be made in the present disclosure without departing from the spirit or scope of the disclosed subject matter. Thus, it is intended that the present disclosure cover the modifications and variations of the disclosed subject matter provided they come within the scope of the appended claims and their equivalents.

What is claimed is:

1. A flexible display panel peeling method, comprising:
   fixing a substrate on which a flexible display panel is disposed to a stage;
   disposing a peeling plate on the flexible display panel, the peeling plate comprising a convex bottom surface configured to contact the flexible display panel and adsorption units disposed at the convex bottom surface;
   adsorbing, via the adsorption units, the flexible display panel; and
   peeling the flexible display panel from the substrate by rocking the peeling plate on the flexible display panel,
   wherein the peeling plate comprises a flat top surface, and
   wherein the convex bottom surface comprises a curved surface having a curvature radius greater than a height of the peeling plate.

2. The flexible display panel peeling method of claim 1, wherein:
   the flexible display panel comprises a first panel end contacting a first end of the convex bottom surface; and
   rolling the peeling plate on the flexible display panel comprises successively peeling the flexible display panel from the first panel end to a second panel end of the flexible display panel.

3. The flexible display panel peeling method of claim 2, further comprising:
   peeling the first panel end of the flexible display panel from the substrate in a second direction perpendicular to a first direction, the first direction being a direction of rolling the peeling plate.

4. The flexible display panel peeling method of claim 3, wherein peeling the first panel end comprises:
   inserting a peeling knife between the first panel end and the substrate in the first direction; and
   moving the peeling knife in the second direction.

5. The flexible display panel peeling method of claim 3, wherein:
the substrate comprises a first region adjacent to the first panel end and a second region; and
the peeling of the first panel end comprises:
scribing, along a boundary between the first region and the second region, a bottom surface of the substrate opposite to a top surface of the substrate contacting the flexible display panel; and
separating the first region from the second region.

6. The flexible display panel peeling method of claim 5, wherein:
the peeling of the first panel end further comprises:
inverting the flexible display panel and the substrate, and re-inverting the flexible display panel and the substrate; and
the scribing of the bottom surface of the substrate is performed between the inverting and the re-inverting of the flexible display panel and the substrate.

7. The flexible display panel peeling method of claim 1, wherein adsorbing the flexible display panel comprises vacuum-adsorbing a top surface of the flexible display panel by the adsorption units.

8. The flexible display panel peeling method of claim 1, further comprising:
disposing the substrate on a stage, the stage comprising an adsorption pad disposed to face the substrate to adsorb the substrate to the stage.

9. A flexible display panel peeling apparatus, comprising:
a stage configured to fix a substrate on which a flexible display panel is disposed; and
a peeling plate comprising a convex bottom surface configured to contact the flexible display panel and adsorption units disposed at the convex bottom surface,
wherein the peeling plate is configured to be rolled on the flexible display panel to peel the flexible panel from the substrate,
wherein the peeling plate comprises a flat top surface, and
wherein the convex bottom surface comprises a curved surface having a curvature radius greater than a height of the peeling plate.

10. The flexible display panel peeling apparatus of claim 9, wherein:
a first end of the convex bottom surface contacts a first panel end of the flexible display panel; and
the peeling plate is configured to successively peel the flexible display panel from the first panel end to a second panel end of the flexible display panel.

11. The flexible display panel peeling apparatus of claim 10, further comprising:
a peeling knife configured to be inserted in a first direction between the flexible display panel and the substrate, and to initially peel the flexible display panel from the substrate in a second direction, the first direction being a rolling direction of the peeling plate and the second direction being perpendicular to the first direction.

12. The flexible display panel peeling apparatus of claim 10, wherein the substrate comprises a first region and a second region, the first region being adjacent to the first panel end, and
the flexible display panel peeling apparatus further comprises a scribing unit configured to scribe, along a boundary between the first region and the second region, a bottom surface of the substrate opposite to a top surface of the substrate contacting the flexible display panel.

13. The flexible display panel peeling apparatus of claim 12, further comprising a substrate inverting unit configured to invert and re-invert the flexible display panel and the substrate,
wherein the scribing unit is configured to scribe the flexible display panel and the substrate when the flexible display panel and the substrate are inverted.

14. The flexible display panel peeling apparatus of claim 9, wherein:
the peeling plate comprises a flat top surface; and
an outer circumferential length of the convex bottom surface of the peeling plate is greater than a first length of the flexible display panel in a first direction.

15. The flexible display panel peeling apparatus of claim 14, wherein:
a first end of the peeling plate comprises a length in a second direction greater than a second length of the flexible display panel in the second direction; and
the second direction is perpendicular to the first direction.

16. The flexible display panel peeling apparatus of claim 9, wherein the adsorption units are configured to vacuum-adsorb the flexible display panel.

17. The flexible display panel peeling apparatus of claim 16, wherein the adsorption units are disposed in a matrix shape on the convex bottom surface of the peeling plate.

18. The flexible display panel peeling apparatus of claim 9, further comprising a stage comprising an adsorption pad disposed to face the substrate, the adsorption pad being configured to adsorb the substrate to the stage.

19. The flexible display panel peeling apparatus of claim 18, wherein the adsorption pad is configured to vacuum-adsorb the substrate.

20. The flexible display panel peeling apparatus of claim 9, wherein the substrate is configured to support one of an organic light emitting display panel, a liquid crystal display panel, a plasma display panel, an electrophoretic display panel, and an electrowetting display panel as the flexible display panel.

* * * * *